United States Patent
Longoni

(10) Patent No.: US 7,914,232 B2
(45) Date of Patent: Mar. 29, 2011

(54) METHOD FOR RECLAIMING LANDS POLLUTED BY HEXAVALENT CHROMIUM

(76) Inventor: Fabio Longoni, Meda (IT)

( * ) Notice: Subject to any disclaimer, the term of this patent is extended or adjusted under 35 U.S.C. 154(b) by 325 days.

(21) Appl. No.: 12/375,003

(22) PCT Filed: Jul. 24, 2007

(86) PCT No.: PCT/IT2007/000524
§ 371 (c)(1),
(2), (4) Date: Jan. 23, 2009

(87) PCT Pub. No.: WO2008/015713
PCT Pub. Date: Feb. 7, 2008

(65) Prior Publication Data
US 2009/0257828 A1    Oct. 15, 2009

(30) Foreign Application Priority Data
Aug. 3, 2006  (IT) .............................. VR2006A0128

(51) Int. Cl.
*B09C 1/08*  (2006.01)

(52) U.S. Cl. .................... 405/128.75; 588/319; 588/412

(58) Field of Classification Search ............. 405/128.75; 588/319, 412
See application file for complete search history.

(56) References Cited

U.S. PATENT DOCUMENTS

| 5,986,159 | A | * | 11/1999 | Aines et al. | ..................... 588/19 |
| 6,221,002 | B1 | | 4/2001 | James | |
| 6,524,842 | B1 | * | 2/2003 | Vainberg et al. | ........... 435/262.5 |

FOREIGN PATENT DOCUMENTS

WO    WO03/022744    3/2003

OTHER PUBLICATIONS

International Search Report from PCT/IT2007/000524.

* cited by examiner

*Primary Examiner* — John Kreck
(74) *Attorney, Agent, or Firm* — Greenberg Traurig, LLP

(57) ABSTRACT

A procedure for the on-site reduction to a predetermined level of the concentration of hexavalent chromium in a saturated or unsaturated contaminated area or ground, in which an in-depth treatment of this area or ground is carried out with a predetermined quantity of a gaseous mixture consisting of hydrogen and another inert gas in order to chemically reduce the hexavalent chromium to a state of lower valence, in particular to the state of trivalent chromium.

6 Claims, No Drawings

METHOD FOR RECLAIMING LANDS POLLUTED BY HEXAVALENT CHROMIUM

This application is a national stage filing under 35 U.S.C. 371 of International Application PCT/IT2007/000524, filed on Jul. 24, 2007, which claims priority from Italian Application No. VR2006A000128, filed on Aug. 3, 2006. The entire teachings of the referenced Applications are incorporated herein by reference. International Application PCT/IT2007/000524 was published under PCT Article 21(2) in English.

TECHNICAL FIELD

This invention refers to a procedure for reclaiming lands polluted by hexavalent chromium.

More specifically, this invention refers to a procedure through which water and land sites polluted by hexavalent chromium are decontaminated by means of a geochemical stabilisation technique which causes a reduction of the hexavalent chromium, mitigating and resolving the ecological problems resulting from the pollution caused by the use of hexavalent chromium.

The invention can be mainly applied in the decontamination of land and water sites polluted by hexavalent chromium, even those of considerable dimensions such as, for example, land beneath industrial buildings in which a wide variety of activities are or were carried out, such as the production of taps and fittings, metal screws, nuts and bolts, from thick chromium plating to esthetic chromium plating of motor vehicle or aeronautical parts, or in the white goods industry, the tanning industry, the production of mordants for dyeing plants, of paints, pigments, varnishes, explosives, ceramics, glass, antiseptics, astringents and defoliants. All these activities, in fact, involve atmospheric emissions in the form of dust or aerosols and the accumulation of solid or liquid machining waste, characterised by various potentially harmful compositions and concentrations.

BACKGROUND ART

Chromium is a whitish metal characterised by considerable resistance that makes it particularly suitable for use in special alloys and compounds that are not highly susceptible to wear and corrosion. It is naturally found as the mineral $FeOCr_2O_3$ (chromite), from which it is extracted in alloy form as iron or as a pure element. It is present chemically in bivalent (II), trivalent (III) and hexavalent (VI) forms.

Cr(III) is a micronutrient for mammals and for man, being an essential constituent of a glucose tolerance factor (GTF). This factor appears to modulate the speed of glucose removal from the blood with an insulin potentiating mechanism. Chromium deficiencies can therefore lead to diseases connected with glucose intolerance and to weight loss. It also seems that Cr(III) participates in maintaining the structural integrity of nucleic acids. The necessary daily dose of Cr(III) is 10-40_g for children up to the age of six months, and 50-200_g for all other ages. Excessive levels of Cr(III) can obviously cause diseases.

Chromium is absorbed through the respiratory system and the skin.

Diseases and disorders can affect the skin (irritation of the nasal mucosa, ulceration of the nasal septum, asthma-like syndromes), the digestive tract (gastroduodenitis, colitis) and sometimes the urinary tract.

Hexavalent chromium has, on the other hand, been recognised as a carcinogen responsible for tumours of the lung.

On the basis of the most recent information, the following conclusions have been reached:
- experimental evidence has shown that the compounds of Cr(VI) used in the production processes of chromates, pigments and in the chrome-plating process are human carcinogens;
- evidence has shown (following experiments on animals) that calcium, zinc, strontium and lead chromates are carcinogens;
- there is no evidence (following experiments on animals) that chromium trioxide ($CrO_3$) and sodium dichromate ($Na_2Cr_2O_7$) are carcinogens.

The *International Agency for Research on Cancer* catalogues Cr(VI) in Group 1 of toxic substances "Carcinogenic to humans". According to U.S. EPA-IRIS (Integrated Risk Information System) data, although the possibilities of interconversion between Cr(III) and Cr(VI) call for caution in dealing with the problem, no risks of Cr(III) causing cancer have been demonstrated, not even via inhalation.

The information on the role of Cr(VI) is drastically different.

It has no known biological roles and is characterised by a toxicity from ten to a hundred times higher than the level of Cr(III). Cases have been reported of acute and chronic oral toxicity, due to inhalation, dermal and systemic absorption, of cytoxicity, genotoxicity and, finally, of carcinogenicity.

The acute toxicity of hexavalent chromium is due to a series of chemical-physical properties (possibility of presenting in various ionic forms, solubility, tendency to form complexes, transport properties). These properties facilitate absorption by the body and the crossing of cellular membranes.

After it enters a cell, its highly oxidating power plays a fundamental role in the interaction with various organic compounds, populating the intracellular plasma, essential for the normal development of metabolism. Molecules such as ascorbic acid (vitamin C), glutathione, flavoenzymes and aldehyde oxidase are all excellent reducers and react favourably with chromates. The oxidation-reduction reactions of these organic molecules with chromium (VI) compounds lead to the formation of free radicals and stable, or metabolic, complexes in which the chromium alters from the state of oxidation (VI) to other forms such as (V) (IV) and (III).

The formation of metabolites and free radicals appears to be the direct cause of the carcinogenic properties of hexavalent chromium. The DNA form chromium-DNA adducts, breaking a sequence, forming cross-links between two chains of DNA or between one chain and a protein, preventing the actual synthesis of the nucleic acid.

These considerations very clearly show the different level of toxicity between hexavalent and trivalent chromium for humans and in general for all living organisms, and the definitive transformation from one state to another represents an invaluable advantage for safeguarding the environment.

If the risk of migration into the lymphatic system of plants and food chains were to be demonstrated, the presence of Cr(VI) in water could cause food contamination which is potentially harmful to consumer health. In order to quantify Cr(VI) in water, it is essential to use sufficiently sensitive analytical methods (capable of determining the quantity at levels of 0.001 mg/L), since it has been verified that the absence of this contaminant has often been ascertained by using a standard method (IRSA and US EPA-diphenylcarbazide colorimetric method) characterised by an insufficient limit of detection (around 0.05 mg/L).

Regardless of the type of source, the contamination present in the ground and groundwater is detected by analysis of the groundwater; usually and for obvious reasons the concentrations are much higher in the groundwater collected close to the source. The groundwater flow together with the high solubility of chromates and dichromates can spread the contamination seven several km away from the source, also involving municipal water system shafts.

The first intervention to be carried out is Pump & treat, that is to say drainage shafts of the polluted groundwater are dug downstream (in hydrogeological terms) of the pollution source area in order to collect a greater quantity with respect to the groundwater flow. An effective barrier is thus created against the spread of the contamination. If the system is the correct dimensions and is properly constructed, the site will be perfectly secured.

The water collected in this way must then be treated in a plant that is able to remove the hexavalent chromium compounds present and is only subsequently discharged in surface water.

The system described above has three fundamental contraindications:
a) the system represents only the securing of the site, it does not eliminate the problem but merely stops it from spreading, this inevitably involves very long periods of time;
b) the plant for the treatment of the polluted water must work with large flow rates but low concentrations (even if three or four times higher than the discharge limits allowed) and is not always able to respect the limits;
c) any drops in flow rate and/or defects in the drainage systems inevitably lead to the spread of non-negligible quantities of pollutants downstream of the barrier.

A reinforcement of the pump & treat system is soil Flushing which consists of forcing the chromium present in the unsaturated phase (the zone above the subjacent groundwater) into the groundwater by means of flushing with injected clean water using a series of shafts and/or basins. Chemical substances could also be added to the water used to improve permeability (surfactants). The shafts are dug close to the source of the pollution.

Also with this treatment, preferably downstream, the groundwater flow is totally collected and treated.

This accelerates the natural process of flushing the pollutants towards the groundwater until they are completely eliminated.

The Soil Flushing system is made more effective in ground allowing good permeability together with a low content of organic carbon and a low ion exchange ability (these last two conditions tend to bind the chromium anions in complexes, reducing their availability in solution).

The negative aspects of this type of treatment are substantially the following:
1) it is unlikely that the conformation and uniformity of the ground is sufficient to allow correct flushing of all the unsaturated area; on the contrary, the disparities in any case present lead to the formation of preferential routes for the water in reaching the groundwater;
2) the extraction of the pollutants from the ground leads to very high concentrations of the pollutants in the groundwater and this makes any spreading due to defects in the drainage system even more dangerous;
3) the use of chemical substances favouring solubility usually have negative environmental effects;
4) the costs involved in setting up the procedures described above are considerable.

Another procedure known to the prior art for the reduction of hexavalent chromium to trivalent chromium consists of geochemical stabilisation.

The process of geochemical stabilisation consists of the direct chemical reduction of hexavalent chromium to trivalent chromium by means of reduction agents distributed in a diluted aqueous solution.

The choice of the reduction agent depends on the characteristics of the ground, the pH conditions and to a considerable extent on the required degree of conversion: for example, iron in ferrous form ($Fe^{2+}$), sodium metabisulfite, etc.

Trivalent chromium is much less mobile and a great deal precipitates in inert compounds. The reaction times are usually fast and the kinetics of the decontamination process are controlled by the time of contact between the chromium and the reagents added in the liquid phase.

As in the previous cases, not only are the hydrogeological features of the solid matrix, such as lithography and permeability, important parameters of the process but the total content of organic carbon (TOC) and the cationic exchange capacity (CEC) are also important as both these factors can have an effect on the non-precipitation of the chromic hydroxides due to the formation of more or less soluble complexes of the cations $CR^{3+}$, $CrOH^{2+}$, $CR(OH)^+$.

In designing a decontamination system by direct geochemical stabilisation, it is necessary to take a series of limiting factors into consideration:
the problems connected with the environmental compatibility of the products dispersed into the ground must be carefully evaluated since their spread cannot always be perfectly controlled;
from a chemical point of view it is necessary to check the stability of the compounds that are obtained from the reactions, also as regards their reversibility;
there is also objective difficulty in the dosage of the reagents (in order to respect the stoichiometry) which leads not only to a possible dispersion of products that are foreign to the natural composition of the solid matrix but would also cause the excess amounts to be carried along in the water trapped by the barrier, excesses that are probably not compatible with the treatment plant.

A technique similar to the previous one but more ecocompatible is biological reduction. This foresees the addition of organic material to the ground together with sulphates which, following bacterial activity, are reduced to sulphides. Once in the ground the sulphides are able to reduce the hexavalent chromium to trivalent chromium according to the chemical activity indicated below.

$$SO_4^{2-}+2C=S^{2-}+2CO_2$$

$$Cr_2O_7^{2-}+12H^++3S^{2-}=2Cr^{3+}+7H_2O+3S$$

Since this is a biological process it is normally very slow since as well as the distribution times of the reagents in the ground it also involves long metabolisation times.

The document U.S. Pat. No. 6,221,002 describes a method reducing the Cr(VI) to a state of less toxic valence. According to this method, ascorbic acid is added at ambient temperature in an aqueous solution and mixed with earth or materials containing Cr(VI) in quantities based on the results of tests on representative samples of the material to be treated.

Another method for in situ chemical reduction of hexavalent chromium, using sulphuric acid and/or phosphoric acid together with hydrogen peroxide, is described in the American patent application no. US-A-2001/0042722.

Yet another method for reducing the Cr(VI) in situ to the trivalent form is described in the international patent application PCT no. WO 03/022744, according to which a reducing agent, which can be a chemical or biological agent or a combination of these, is distributed on the surface of the ground to be treated and the ground is then watered in order to make the reducing agent sink deep into the ground.

In general, it also seems appropriate to mention the criteria that should be adopted in choosing one of the various decontamination techniques. The main aspects are as follows:
a) decontamination techniques should be favoured that permanently and significantly reduce the concentration in the various environmental matrices, the toxic effects and the mobility of the polluting substances;
b) decontamination techniques should be favoured that tend to treat and reutilise the ground at the site, by means of on site treatments, with a consequent reduction of the risks caused by transport and dumping of the polluted earth;
c) any additional risk (with respect to those already existing) of pollution of the air, the subterranean and surface waters, the soil and subsoil should be avoided, as well as problems caused by noise and smells;
d) hygiene-health risks for the population while the operations are being carried out should be avoided;
e) techniques should also be chosen on the basis of economic aspects, which must include the long-term management costs connected with any safety measures and relative controls and monitoring.

Preferred techniques are those that allow the pollutants to be eliminated from the physical means in which they are found, without transferring them to any other matrix. The systems that best satisfy these requirements are biological since the most commonly used chemical-physical and thermal techniques (extraction of vapours, chemical washing, heat desorption and the like) are based on removing the pollutants from the soil but not on their definitive elimination. Some known technologies, based mainly on biological treatments which are suitable for application at the site to be decontaminated, attempt to satisfy the additional need to reduce the risks caused by transport of the contaminated material.

It should also be pointed out that the application of classic methods often encounters severe limitations, also for types of pollution that are theoretically compatible with these methods.

Decontamination times are generally long and, in the case of ex situ treatments, require large-dimension installations and, for in situ treatments, long-term monitoring. They often do not in any case allow residual concentrations to be reduced to admissible limits, because of the chemical/biological refractoriness or the poor bioavailability of some organic compounds.

On the other hand, pollutants and chemical reagents are often characterised by a high degree of toxicity and consequently by particularly stringent regulatory limits.

As regards the preference for on site treatments, it should be taken into account that the advantage to be gained by not transporting the contaminated material away from the site can be countered by the fact that although on site treatments may cause less problems at a local level there is a high degree of uncertainty regarding the time needed for decontamination. It should also be pointed out that treatment centralisation can imply considerable savings and that, for many technologies that in any case require excavation of the soil, this alternative is very frequently adopted in the most advanced European countries in the decontamination sector.

The applicability of the various techniques should be assessed according to a series of parameters connected not only with the type of pollutants, but also with the characteristics of the matrix, the spatial distribution of the contamination, the nature of the area and the operating conditions of the plants to be used for the decontamination.

DESCRIPTION OF THE INVENTION

This invention proposes to overcome the problems and disadvantages of the known techniques, and to therefore offer a procedure for the decontamination of land and groundwater polluted by hexavalent chromium which is effective, technically easy to perform and which makes it possible to obtain considerable advantages in terms of time and implementation costs.

This is achieved by means of a procedure with the features described in the main claim. The dependent claims describe particularly advantageous embodiments of the procedure according to this invention.

According to this invention, the technology for the decontamination of land and groundwater polluted by hexavalent chromium is based on an on-site process of geochemical stabilisation by reduction of the hexavalent chromium to trivalent chromium by means of a reaction with gaseous hydrogen.

The process therefore aims at the chemical reduction of Cr(VI) (adsorbed in the ground, in the saturated and unsaturated atmosphere and present in solution form in the groundwater) to Cr(III) by means of a totally innovative reaction, using reagents with a very low environmental impact and producing harmless reaction products. The process leads to the complete reduction of Cr(VI) to Cr(III) and thus to the elimination of the toxicity of all the polluted matrices.

The reaction achieves almost total conversion of the Cr(VI) to Cr(III) as it exploits the various features of solubility, adsorption on the solid matrix, mobility and chemical behaviour of the two ionic species. The essential difference is that Cr(VI) as an anion is highly soluble in water and thus mobile along the front of the groundwater, while Cr(III) pH>5 is essentially insoluble and also complexes easily with some compounds.

According to the invention, the reaction applied is a reduction of the Cr(VI) by means of gaseous hydrogen; advantageously, this reduction is associated with a complexing of the Cr(III) produced with oxalic acid (another electron donor and a strong chelating agent).

The reactions that take place will be described in more detail below, as will the characteristics of all the compounds involved in the procedure according to the invention.

The procedure according to the invention is based on a technique of injection through shafts of the reducing mixture directly into the groundwater and/or the unsaturated zone.

According to a preferred embodiment of the invention, the reducing mixture is a gas containing 4% hydrogen and 96% of an inert gas, for example nitrogen, with flow rates that are not particularly high and continuous or intermittent depending on the parameters of the project and the doses calculated.

Hydrogen is a molecule with very small dimensions and it therefore spreads easily in the porosity of the ground, whether saturated or unsaturated. It also dissolves in the groundwater by taking advantage of hydrostatic pressure. Hydrogen is therefore easily consumed, the exhausted gaseous mixture is thus a substantially inert gas, in small quantities, that can be discharged in the atmosphere or recovered by using vacuum extraction techniques.

According to a preferred embodiment of the invention, an appropriate solution of oxalic acid is added, through the same shafts, at appropriate intervals and doses, to the 3-phase system that is created in the ground.

The injection shafts allow the gaseous mixture to reach the lowest and deepest points, at the limit of the impermeable substratum to give the gas the maximum time to reascend and therefore be in contact with the ground.

The high level of reactivity, flexibility and effectiveness of the system according to the invention makes it possible to plan on-site decontamination by acting on the core of the pollution, at each point where Cr(VI) is detected, and by using the injection shafts as a reactive barrier to prevent the spread of the pollution.

In addition, the hydrogen that remains in solution with the oxalic acid moves with the propagation front of the groundwater, continuing the reduction action and giving the process a very important dynamic character in terms of space-time.

All the parameters involved in the on-site decontamination of land and groundwater polluted by Cr(VI) by means of the technique described above will be described in detail. This will reveal all the advantages of the process according to the invention.

As regards the reagents used in the process according to the invention, these can be defined as follows:

A) Chromium

Its compounds and main characteristics have already been described; this section summarises some important points:

Cr(VI) is present in groundwater as a chromate $CrO_4^-$ or dichromate $Cr_2O_7^=$ ion; the relative concentration between the two species depends on the pH of the contaminated water and the total concentration of Cr(VI)

| at pH > 6.5 | $[CrO_4^-] > [Cr_2O_7^-]$ |
| $[CrVI]_{TOT} > 30$ mM | $[Cr_2O_7^-] > [CrO_4^-]$ |

In both forms the Cr(VI) is a strong oxidant and as such is reduced in the presence of electron donors.

In saturated/unsaturated ground, fundamental parameters must be considered, such as:

| the distribution coefficient | |
|---|---|
| 19 l/kg for Cr(VI) | $1.8 \times 10^6$ for Cr(III) |
| solubility | |
| $>10^6$ microg/l for Cr(VI) | 50 for Cr(III) |

Cr(VI) and Cr(III) in water are essentially in chemical equilibrium, but if all the chromium is transformed into Cr(III) it is oxidised to Cr(VI) only by oxygen and manganese dioxide. The reduction from Cr(VI) to Cr(III) is substantially irreversible.

Redox potential Cr(VI)/Cr(III)=0.52V

B) Oxalic Acid

At 20° C. it is soluble in water up to 10%=102 g/L;
White solid with pH=0.7;
Essentially non-toxic, rat LD=475 mg/kg;
Potential danger for the environment: NONE;
Reacts with bases, ammonia, halogenated acid alcohol and metals to produce $CO_2$, CO and $H_2O$;
Ecological data: COD=0.18 g/g BOD=0.16 g/g;
Strong oxidant, electron donor, chelating agent
The acid dissociates $C_2H_2O_4 \rightarrow 2H^+ + 2CO_2 + 2e^-$
Redox potential=−0.90V.

Any excesses of oxalic acid therefore dissociate completely in $CO_2$ and $H_2O$.

The doses in the innovative process of Cr(VI) reduction do not foresee a marked rise of the COD in the treated matrices, nor a significant decrease of the pH.

Oxalic acid can provide electrons for the reduction of Cr(VI) to Cr(III) and donate COOH groups for the coordination of Cr(III) to $[Cr(C_2H_2O_4)_6]^{3+}$ C) Hydrogen Inflammable gas in the air for values higher than 4%.
Simple asphyxiating gas (like nitrogen) at high concentrations, but not toxic;
It is the lightest and one of the smallest chemical elements;
Atomic hydrogen, also known as active hydrogen, has an extremely energetic reducing power on many chemical compounds such as oxides, halides, sulphides, alkaline metals and metals;
In reduction reactions in solution it loses its electron, forming $H_3O^+$;
Its relative density is 0.07 (for the air it is 1) and it is therefore a gas with a very high diffusivity and also crosses the porosity of metals (e.g. diffusivity in aluminium=$0.88 \times 10^{-8}$ m²/s);
The parameters of interest are connected with the transport of hydrogen in the matrix (e.g. the ground): diffusivity, porosity and solubility;
The solubility of hydrogen in water depends on the temperature: at 20° C. it is 1.6 mg/l.

The reduction and complexing reactions that involve the reagents described above take place only in the aqueous phase. However, in unsaturated ground there is almost always a sufficient level of humidity to allow the reaction to develop.

The reactions and equilibriums that take place are as follows:

1. the equilibrium between the aqueous forms of Cr(VI), which depends on the pH of the ground and of the groundwater:

$$Cr_2O_7^= + 2OH^- \leftrightarrow 2CrO_4^= + H_2O$$

The presence of $CrO_4^=$ is detected at 6<pH<8

2. the reactions of reduction of Cr(VI) to Cr(III) (considering the presence of both forms of Cr(VI))

$$Cr_2O_7^= + 14H_3O^+ + 6e^{-1} \leftrightarrow 2Cr^{3+} + 21H_2O$$

$$2 \times (CrO_4^= + 4H_2O + 3e^- \leftrightarrow Cr(OH)_3 + 5OH^-)$$

3. the reduction of Cr(VI) takes place by means of oxygen which in an aqueous environment donates electrons $$6 \times (H_2 + H_2O \leftrightarrow 2H_3O^+ + 2e^-)$$

IN TOTAL $$Cr_2O_7^= + 2CrO_4^= + 12H_3O^+ + 6H_2 \leftrightarrow 2Cr^{3+} + 2Cr(OH)_3 + 21H_2O$$

The products of the reaction, which takes place at total conversion also by means of oxalic acid (when present), are SOLELY Cr(III) (also in the form of hydroxide) and water.

4. Cr(III) complexes with the oxalic acid and is removed from the reaction, which proceeds constantly towards the right. The oxalic acid (when used) can therefore donate electrons useful for the reduction of Cr(VI). The foreseen dosage, however, aims essentially at the coordination reaction without modifying the overall pH of the treated matrices $$C_2H_2O_4 \rightarrow 2H^+ + 2CO_2 + 2e^-$$

$$Cr^{3+} + C_2H_2O_4 \rightarrow [Cr(C_2H_2O_4)_6]^{3+}$$

The use of oxalic acid involves $CO_2$ as an additional reaction product.

These reactions proceed at high speeds and are influenced by the following parameters:
reducing power of the matrices;

pH;
temperature;
ionic exchange ability.

Implementation of the Method According to the Invention.

The method according to this invention is implemented on site on land polluted by hexavalent chromium and in which, as usual, a complete analysis of the concentration values of Cr(VI) is carried out in order to obtain an overall picture of the decontamination that must be carried out in a certain area. It is, for example, in this step that the existence of a substantially closed polluted area is ascertained or of a continuous effusion of Cr(VI) towards moving groundwater. In particular, fundamental parameters are determined, such as the depth of the contamination, the depth to be decontaminated, the surface to be decontaminated, the permeability of the ground and the concentration of pollutant in the area to be decontaminated.

Once the overall situation of the area to be contaminated has been assessed, a sufficient number of injection shafts are dug in positions and at depths appropriate to the hydrogeological complexity and disparity of the site and to the distribution of the potential centres of contamination. This is done in order to create, if necessary, a reactive barrier against the advance of the contamination.

A gaseous mixture comprising hydrogen and another inert gas, advantageously nitrogen, in predetermined percentages, is then injected continuously into the shafts and spreads in the ground causing the reaction of reduction of Cr(VI) to Cr(III).

The percentage of hydrogen to be used in the decontamination mixture could theoretically be higher than 4%. However, as hydrogen is inflammable at percentages higher than 4%, safety reasons dictate the use of a gaseous mixture with a hydrogen content of no more than this percentage. In this way the mixture is inert and in no way could inflammable atmosphere concentration phenomena be created when the method according to the invention is carried out.

The method according to the invention makes it possible to achieve important advantages with respect to methods know to the background art.

The first immediate advantage is represented by the simplicity and the high level of ecocompatibility of the reagents (also with respect to any dispersion of excess amounts) and of the subsequent reaction products.

The use of a gaseous reagent has demonstrated enormous advantages relative to its diffusivity in the ground, managing to involve both the liquid phase and the unsaturated phase (traditional systems with reagents in aqueous solution are so heavily affected by the hydrogeological conditions of the ground that the contact between the reagents are slowed down, and sometimes made impossible).

The characteristics of the solid matrix such as the oxidation-reduction potential, the pH or the ionic exchange capability can slightly influence the speed of the reaction of the chromium with the hydrogen, but not the complete conversion of the Cr(VI) to Cr(III); this chemical conversion applied on site has no limits as regards the initial concentration of Cr(VI) to be treated.

The dissolved hydrogen also tends in any case to remain solubilised in the water, increasing its mobility with the movement of the groundwater, until it reaches all points of the contamination.

In operative terms, it must be taken into account that the use of a gaseous mixture, where it is possible to vary the injection pressure very easily, does not foresee limits as regards the depth of the shafts.

The characteristics of the area to be decontaminated do not limit the applicability of the technique, which has the exceptional advantage of not modifying the use of the area; given its particular features, it also allows the total recovery of abandoned areas.

The invention claimed is:

1. A procedure for the on-site reduction to a predetermined level of the concentration of hexavalent chromium in a saturated or unsaturated contaminated area or ground, comprised of the in-depth treatment of this area or ground with a predetermined quantity of a gaseous mixture consisting of hydrogen and another inert gas in order to chemically reduce the hexavalent chromium to a state of lower valence, in particular to the state of trivalent chromium.

2. A procedure according to claim 1, in which the hydrogen is present in the gaseous mixture at a percentage not greater than 10%.

3. A procedure according to claim 2, in which the percentage of hydrogen does not exceed 4%.

4. A procedure according to claim 1, which comprises the preparation of a network of shafts of different depths for the injection of the gaseous mixture in the polluted area or ground to be decontaminated.

5. A procedure according to claim 1, in which the inert gas used in the gaseous mixture is nitrogen.

6. A procedure according to claim 1, in which predetermined quantities of an oxalic acid based solution are injected at predetermined time intervals in order to complex the Cr(III) produced by the reduction of Cr(VI).

* * * * *